United States Patent [19]

DuVall et al.

[11] Patent Number: 4,706,227
[45] Date of Patent: Nov. 10, 1987

[54] ACOUSTIC OBSTRUCTION DETECTOR AND METHOD

[75] Inventors: Dale R. DuVall, Keller; John E. Bateson, Carrollton; Lew V. Hewitt; David P. Hewitt, both of Corpus Christi, all of Tex.

[73] Assignee: Overhead Door Corporation of Texas, Dallas, Tex.

[21] Appl. No.: 824,723

[22] Filed: Jan. 31, 1986

[51] Int. Cl.$^4$ ................................................. G01S 9/66
[52] U.S. Cl. ......................................... 367/96; 367/87; 367/99; 49/25; 187/52 R
[58] Field of Search .............................. 367/87, 96, 99; 49/25-28, 31; 187/51, 52 R, 52 LC, 56

[56] References Cited

U.S. PATENT DOCUMENTS

| | | | |
|---|---|---|---|
| 2,991,468 | 7/1961 | Post | 367/900 X |
| 3,742,434 | 6/1973 | Leyde et al. | 367/96 |
| 4,029,176 | 6/1977 | Mills | 367/96 |
| 4,031,743 | 6/1977 | Kossoff et al. | 367/900 X |
| 4,621,452 | 11/1986 | Deeg | 49/25 |

*Primary Examiner*—Thomas H. Tarcza
*Assistant Examiner*—Daniel T. Pihulic
*Attorney, Agent, or Firm*—Kenneth R. Glaser

[57] ABSTRACT

Obstruction detector apparatus operatively coupled to an automatic electric door operator compares the time span of transmission and receipt of reflected echoes of ultrasonic energy within a door passageway obstruction zone with predetermined time spans in order to prevent door closure under conditions indicating passageway obstruction or system malfunction. Signal generators provide timing signals respectively representative of the anticipated time span of reflected echoes from locations in front of, and beyond, the door jamb opposite the ultrasonic transmitter and receiver transducers for comparison by a relay controller with the time of generation of a signal representing a reflected echo at the transducer receiver, the relay controller appropriately actuating a door operator relay in response to such comparison. Various network portions provide pulse generation to the transmitter, an initial blanking period during which reflected echoes are disregarded, and programmed gain control for electronically shaping an obstruction detection zone to a proximate area of specific interest.

9 Claims, 12 Drawing Figures

ACOUSTIC OBSTRUCTION DETECTOR AND METHOD

The present invention relates generally to automatic passageway closure systems, more particularly to obstruction detector apparatus for automatic door closing equipment, and even more particularly to an improved method and apparatus utilizing ultrasonic energy for detecting the presence or absence of obstructions within a door passageway and for effecting control of an automatic door operator in response thereto.

Passageway closure systems, such as automatic sliding glass doors, are in widespread use at entranceways to supermarkets, office buildings, and the like. In accordance with the wellknown operation of these systems, an electrical door operator effects automatic opening and closing of one or more doors under the control of various types of sensors which detect the approach of a pedestrian toward the door passageway to automatically open the door, and thereafter reclose the door after the pedestrian has passed through such passageway.

One of the requirements for the effective and safe operation of these automatic door closure systems is the need for an adequate system for detecting the presence of a person or object in or near the passageway (i.e. a passageway obstruction) and preventing the closing of the doors during the presence of such obstruction. While various types of mechanical and electronic devices have been designed and utilized for such purpose, none have been entirely acceptable for all conditions of service.

It is therefore the principal object of the present invention to provide a new and improved method and apparatus for obstruction detection in connection with automatic passageway closure systems.

It is another object of the present invention to provide new and improved obstruction detector apparatus of the type utilizing acoustic energy for its operation.

It is a still further object of the present invention to provide a new and improved ultrasonic obstruction detection apparatus which effectively prevents door closure in an automatic door closure system except under conditions which clearly indicate the absence of any obstructions within or near the doorway.

In accordance with these and other objects, the present invention provides a unique method and apparatus for transmitting acoustic energy, preferably in the ultrasonic range, across a door passageway, and therefore comparing the transit time associated with reflected echoes to determine whether such echoes are indicative of passageway obstructions or possible system malfunction, thereby to prevent door closure, or are indicative of a clear condition within such passageway, thereby to allow door closure. In accordance with particular features of the obstruction detector apparatus of the present invention, unique means are provided to, in essence, electronically shape the obstruction detection zone to an area of specific interest, as well as to disregard received echoes except those from true obstructions within the passageway.

Specific and additional features of the invention, as well as additional objects and advantages thereof, will become more readily understood from the following detailed description taken in conjunction with the accompanying drawings, in which:

Figure 1:
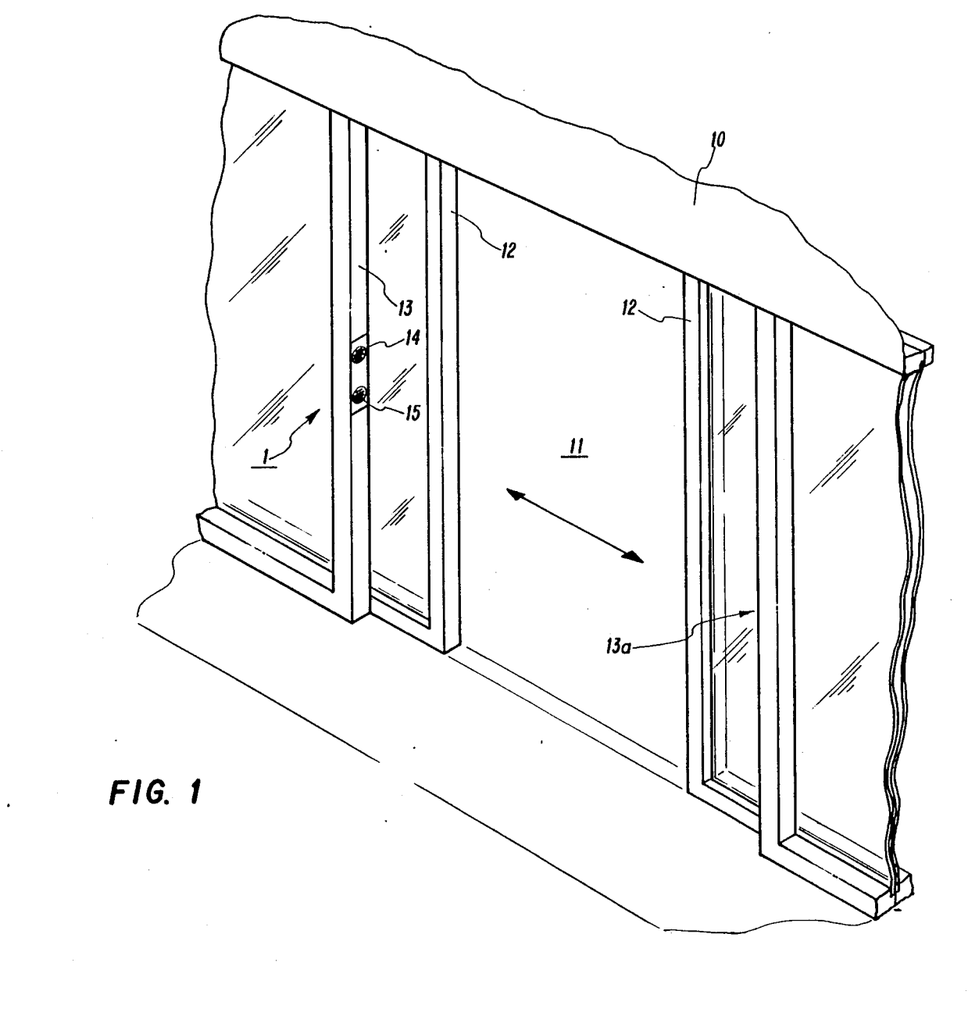
FIG. 1 is a pictorial view of a typical automatic sliding glass door system illustrating the incorporation of the obstruction detector apparatus of the present invention therewith.

Referring initially to FIG. 1, a typical automatic passageway closure system would include a frame assembly 10 defining a passageway 11 with one or more closure members 12 being automatically operated (by operator means, not shown) for respectively closing and opening the passageway. For convenience of description, the closure system specifically depicted in FIG. 1 comprises a pair of sliding glass doors 12 adapted to be opened and closed in the lateral direction shown by the arrows; but it is to be understood that such is only illustrative of one type of automatic passageway closure system for which the obstruction detector apparatus of the present invention can be utilized. For example, the closure member may be a single door or window; the closure may be of the swinging, rather than sliding, type; and/or rather than being laterally movable, the closure may be of the "overhead" door type, in which event the door would be operated in the vertical direction to open and close the passageway 11, all as conventionally known in the art.

The principal purpose of the obstruction detector apparatus of the present invention is to prevent doors 12 from closing whenever an obstruction, which may be a person or an object, is anywhere within a zone which includes the passageway 11 and the opposite areas adjacent to, and in the transverse direction of transversal through, such passageway. Such zone shall be hereinafter referred to in the description and claims as the "obstruction detection zone".

Accordingly, and to accomplish this objective, the obstruction detector apparatus of the invention includes an acoustic energy transmitter device 14 disposed at one of the door jambs 13, the transmitter adapted to direct acoustic waves, preferably in the ultrasonic range, in the lateral direction of the passageway 11 toward the opposite door jamb 13a (or other adjacent sound reflecting door frame portions). An acoustic energy receiver device 15 of the same frequency range as, and mounted immediately adjacent to, the transmitter 14 is adapted to receive reflected echoes of the ultrasonic waves generated by transmitter 14. In accordance with the details and operation of the obstruction detector apparatus subsequently described, such apparatus is effective to prevent doors 12 from closing whenever (1) such reflected echo is received by receiver 15 during a time span (from transmission to reception) that is less than the anticipated time span of the transmission and reception of the ultrasonic energy to and from the door jamb 13a, thus indicating the presence of an "obstruction" in the obstruction detection zone or (2) an echo is not received within (or after) an allotted time corresponding to the anticipated time span that an echo should have been received by receiver 15 from door jamb 13a, thus indicating the possible diversion of reflected energy from an obstruction to a location outside of a path that would cause it to impinge upon receiver 15 or some other type of malfunction in the system.

Figure 11:
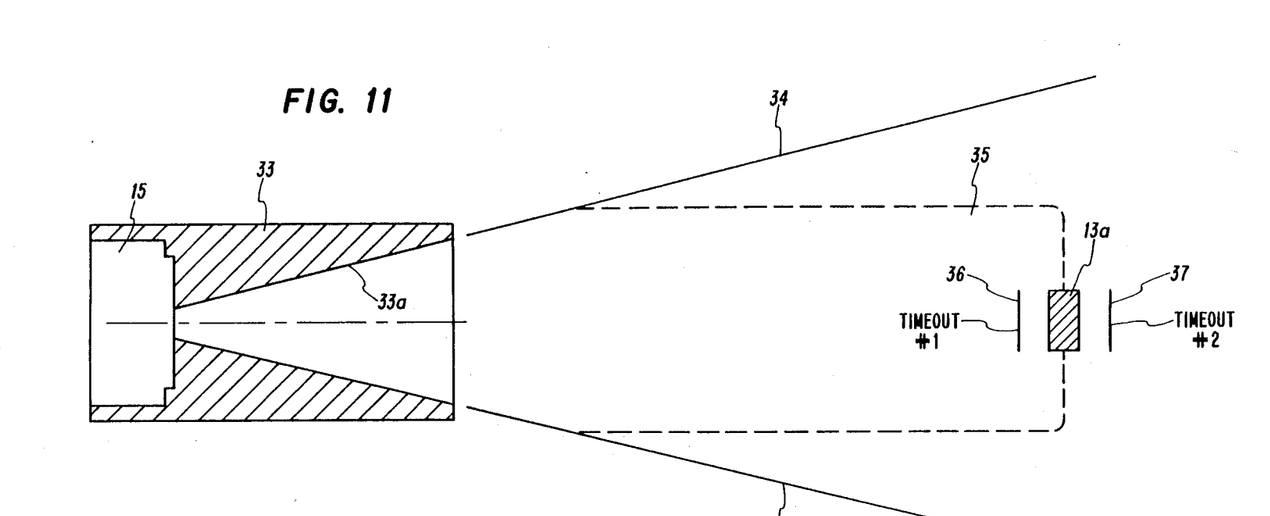
FIG. 11 is a top view of the ultrasonic transducer receiver assembly, partially in section, diagrammatically illustrating the ultrasonic wave pattern and obstruction detection zone associated therewith, and their interrelationship.

A graphic depiction of the apparatus operation in accordance with the aforestated conditions is provided in FIG. 11 wherein the area 35 within the dashed lines constitutes the obstruction detection zone; line 36 represents a location in the energy transmission path immediately in front of door jamb 13a; and line 37 represents a location in the energy transmission path immediately behind door jamb 13a. The anticipated time span that it would take for the transmitted energy to travel from transmitter 14 to location 36 and be reflected back to receiver 15 is referred to as TIMEOUT #1; and the anticipated time span of travel of the energy from transmitter 14 to location 37 and return to receiver 15 is referred to as TIMEOUT #2. Thus, doors 12 are prevented from closing whenever the reflected echo is received during a time span less than TIMEOUT #1 or is not received during a time span represented by TIMEOUT #2.

Figure 2:
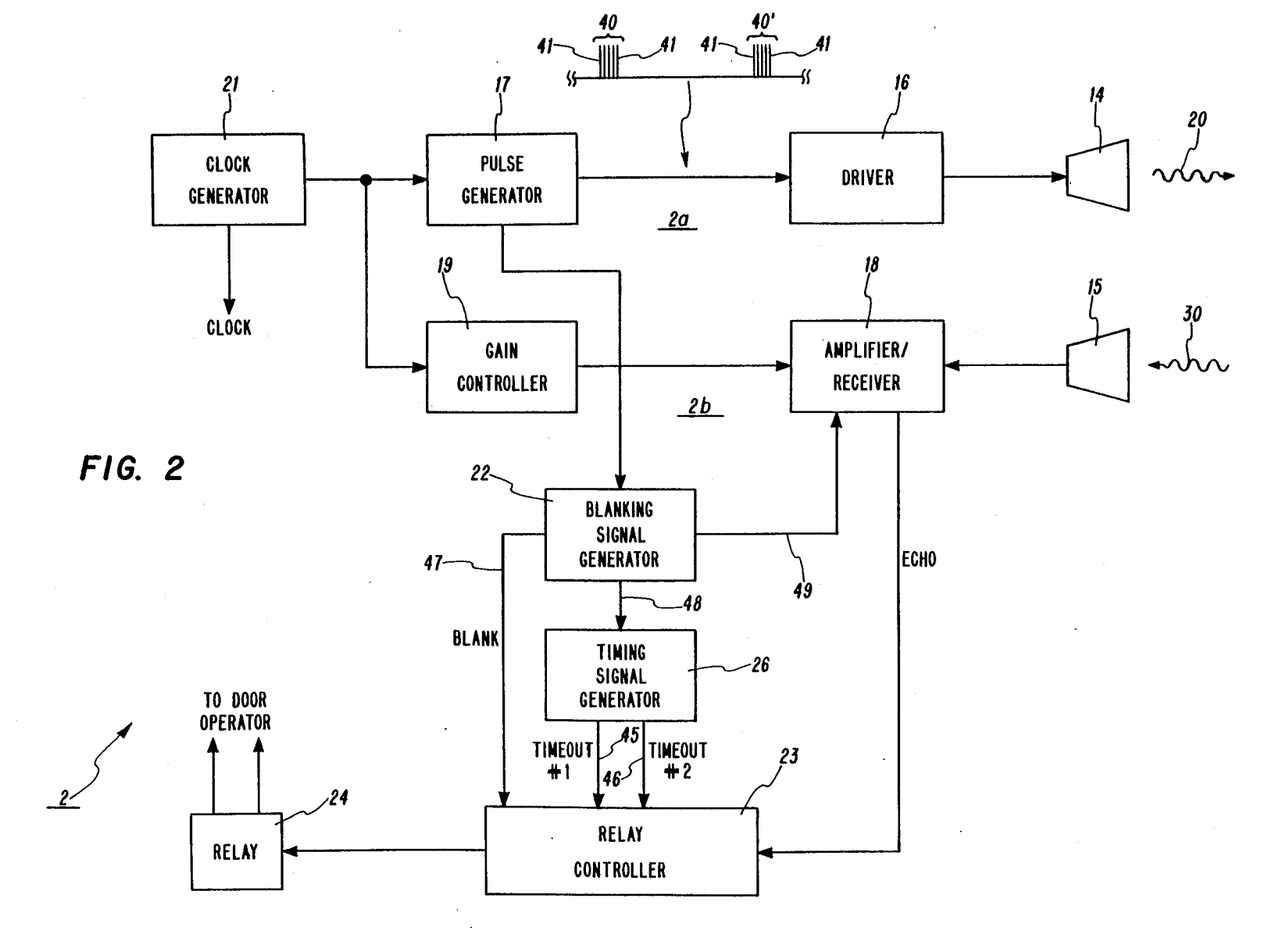
FIG. 2 is a simplified block diagram schematic of the overall obstruction detector apparatus of the present invention.

The construction and operation of the obstruction detector apparatus of the present invention is now described with initial reference to FIG. 2 illustrating the block diagram schematic 2 thereof. In accordance with a preferred embodiment, both transmitter 14 and receiver 15 are piezoelectric devices which respectively emit and receive acoustic energy in the ultrasonic range and at a specified desired frequency. While the transmitter and receiver are preferably depicted as being two separate devices, it is also possible to use a single piezoelectric device providing both the "transmit" and "receive" functions. The preference for separate devices, however, is to eliminate the need for a long blanking time which would normally be required due to the continuation of "ringing" of the piezoelectric device after removal of the drive transmitting signal.

More specifically, one type of suitable transmitter 14 is a piezoelectric acoustic wave generator currently manufactured by Massa Products of Hingham, Mass., and effective, when excited by the signal from the output of driver network 16, to emit acoustic energy in the form of ultrasonic waves 20 at the desired frequency, in this particular example at 40 KHz Coupled to the input of driver network 16 is a pulse generator 17 which is effective to generate at its output short time-spaced bursts 40, 40', etc. of signal pulses 41, the pulses 41 being at the desired 40 KHz operating frequency of transmitter 14. These signals are then amplified and applied to the piezoelectric transmitter 14 by driver network 16. It is thus apparent that piezoelectric transmitter 14 acts as a transducer, converting the electrical signals from the output of driver network 16 to time-spaced bursts of ultrasonic waves 20.

Acoustive energy receiver 15 is provided by an essentially identical device, and operating at essentially the same wavelength and frequency, as transmitter 14. Like transmitter device 14, receiver 15 acts as a transducer converting the received ultrasonic energy 30 (which constitutes the reflected echoes of transmitted energy 20) to electrical signals.

The reflected echo signals from transducer 15 are coupled to the input of an amplifier/receiver 18 which is effective to detect and amplify these signals for input to a relay controller 23. In accordance with the advantageous operation of the obstruction detector apparatus of the invention, however, it is preferred that the "echo" signals passed to the relay controller 23 only be from those objects which have been detected within the obstruction detection zone 35 (FIG. 11). To effect such result, and in accordance with a feature hereof, the amplifier/receiver 18 is gain-controlled to suitably amplify (and therefore output to relay controller 23) only those "echo" signals representing reflections from objects within the zone 35; and in accordance with a further unique feature, such gain control is effected by a gain controller 19 which provides digitally programmed gain data to amplifier 18 to effect an obstruction detection "envelope" corresponding to the zone 35 configuration.

More specifically, and with reference now to FIG. 11, the receiver 15 is mounted within a metallic focusing horn 33 of conical configuration having its internal wall 33a so-angled to define an initial wave receiving pattern represented by boundary lines 34. The focusing horn 33, therefore, in essence constitutes a waveguide which physically shapes the wave pattern in the manner depicted in FIG. 11.

Since the wave pattern would, unless otherwise altered, undesirably generate echo signals indicating objects outside of the preferred obstruction detection zone 35, the gain of amplifier 18 is controlled to amplify (and pass) only those echo signals from objects within the zone. This control is effected by the gain controller 19 which provides programmed gain which has been experimentally determined to correspond to predetermined signal strength of echoes from objects within the desired obstruction detection zone. This programmed digital gain control thus, in effect, electronically shapes the wave pattern to that represented by the dash lines in FIG. 11.

Relay controller 23 is, in effect, a time comparator which initially compares the elapsed time for receipt of the "echo" signals with the time spans respectively represented by TIMEOUT #1 and TIMEOUT #2, and thereafter activates relay 24 (to the door operator) to maintain doors 12 in their open position whenever (1) the "echo" signal is received prior to TIMEOUT #1 (indicating obstruction within passageway) or (2) whenever an echo is not received at the end of TIMEOUT #2 (indicating diverted reflections or system malfunction), allowing the doors 12 to close whenever the echo signal occurs between TIMEOUT #1 and TIMEOUT #2 (indicating reflection from door jamb 13a and a "clear" condition).

Accordingly, a timing signal generator 26 is provided to generate a timing signal 45 (representing TIMEOUT #1) and a timing signal 46 (representing TIMEOUT #2), these two timing signals (and echo signal from amplifer 18) being inputted to relay controller 23 for comparison and, depending upon such comparison, actuation (or non-actuation) of relay 24 under the conditions previously described.

It has been observed that immediately after the generation of a transmission energy pulse from transmitter 14, echo signals may be generated due, for example, to reflections from door jamb 13 or residual ringing of transmitter 14. These initial echo reflections would, unless accounted for, give false indications of an obstruction where none actually exists. Consequently, and in accordance with a feature of the present invention, an initial "blanking period" is established, during which time the apparatus, and particularly controller 23, is prevented from actuating relay 24 (to maintain doors open) due to these false obstruction echoes. Specifically, this is accomplished by a blanking signal generator 22, synchronized by a start signal from pulse generator 17, which is effective to generate signal 47 (as well as signals 48 and 49) initiating this blanking period and preventing relay actuation during such period. Thus, for a short time period after the initiation of each sonic burst from transmitter 14, blanking signal generator prevents the obstruction detector from responding to echoes received by receiver 15.

Generator network 21 is effective to provide the system "clock" to synchronize the transmit and receive operations (and component functions) as well as to generate a square wave of desired frequency, in this instance 40 KHz, for the purpose of transducer 14 excitation. Accordingly, one output of clock generator 21 is coupled to both pulse generator 17 (in the transmit leg 2a) and to gain controller 19 (in the receive leg 2b) to provide the 40 KHz square wave signal thereto, with a higher frequency clock signal (i.e. 400 KHz) being available at another output While various types of conventional circuitry known in the art can be utilized for the respective network portions depicted in FIG. 2, FIGS. 3 thorugh 10 depict one preferred form of each of such portions.

Figure 3:
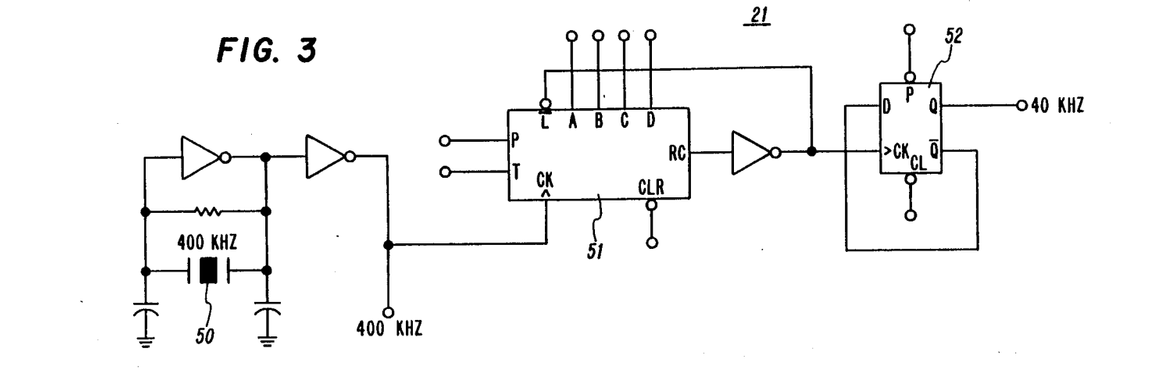
FIG. 3 is a simplified logic schematic diagram of a preferred embodiment of the clock generator portion depicted in FIG. 2.

Accordingly, FIG. 3 depicts a preferred form of the clock generator 21 which includes a 400 KHz ceramic resonator oscillator 50, with interconnected digital counter 51 and flip-flop network 52 effective to provide the 40 KHz square wave signal.

Figure 4:
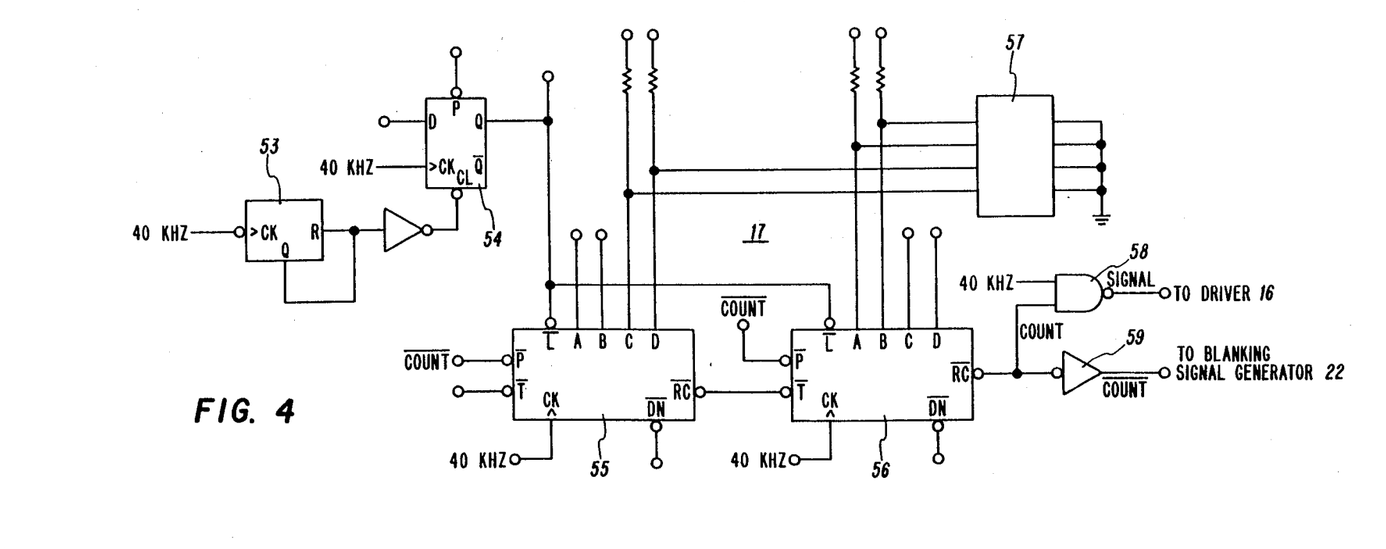
FIG. 4 is a simplified logic schematic diagram of a preferred embodiment of the pulse generator portion depicted in FIG. 2.

FIG. 4 depicts a preferred form of the pulse generator 17. The 40 KHz square wave signal from clock generator 21 (FIG. 3) is applied to digital counter 53; flip-flop 54; digital counter 55; digital counter 56; and gate 58. Counter 53 and flip-flop 54 are effective to appropriately further divide the 40 KHz signal to initiate signal bursts 40, 40', etc. at the desired time intervals, digital counters 55 and 56, along with switch network 57, controlling the number of pulses 41. The resulting signal $\overline{COUNT}$ is then provided to gate 58 to gate the 40 KHz signal to driver network 16. This signal $\overline{COUNT}$ is also inverted (by logic inverter 59) to $\overline{COUNT}$ for routing to blanking signal generator 22 for initiation of each blanking period.

Figures 5, 6:
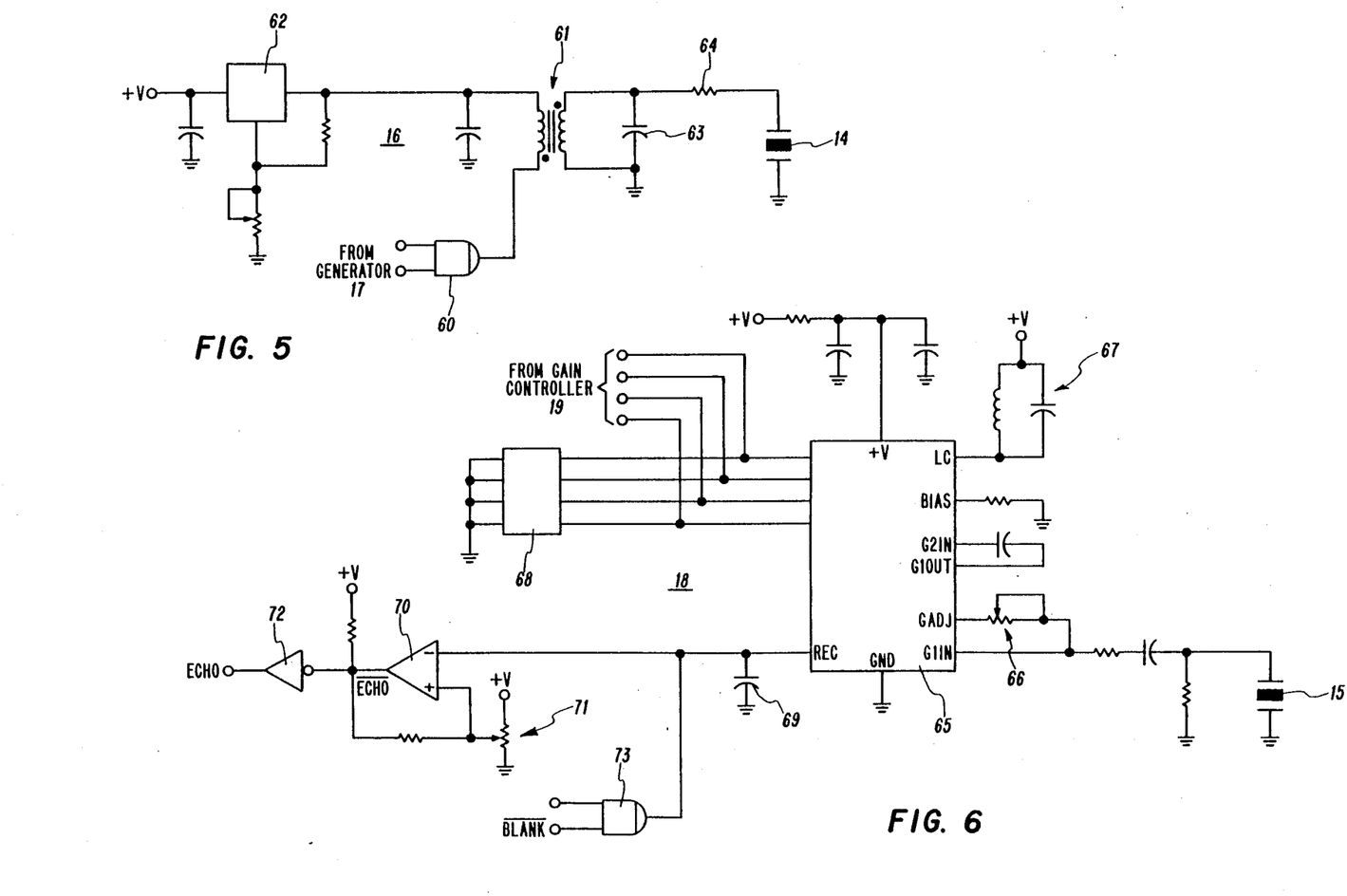
FIG. 5 is a simplified logic schematic diagram of a preferred embodiment of the transmitter driver portion depicted in FIG. 2.
FIG. 6 is a simplified logic schematic diagram of a preferred embodiment of the amplifier/receiver portion depicted in FIG. 2.

FIG. 5 depicts a preferred form of driver network 16. Accordingly, the pulse train from pulse generator 17 is applied as one input to a buffer 60, the output of which drives the primary of a transformer 61. The signals are thus transformer-coupled to piezoelectric transmitter 14, with an adjustable voltage regulator 62 setting the drive power to the transmitter 14 and being effective as a gain control therefor. The secondary winding, along with capacitor 63 and piezoelectric device 14, provide a tuned circuit with resistor 64 providing damping.

A preferred form of the amplifier/receiver 18 is depicted in FIG. 6. At the heart of the network is a digitally gain controlled amplifier 65, preferably a device designated the TL852 manufactured by Texas Instruments of Dallas, Tex. A potentiometer 66 provides the initial gain adjustment, a parallel resonance circuit 67 tuning the amplifier to the desired frequency, in this instance 40 KHz. The gain control of the amplifier can be fixed manually by a switching network 68 or, in accordance with the feature previously described, by the output of the PROM portion (FIG. 10) of the gain controller 19, thereby selectively boosting those echo signals representing reflections within the particular obstruction detection zone. It is of course understood that when the unique gain controller 19 is employed, switching network 68 will be disconnected.

The signals representing the reflected (echo) energy to receiver 15 are detected and selectively boosted by amplifier 65 with the resulting variable amplified echo pulses being integrated by capacitor 69 and applied to one input of a comparator 70, comparator 70 passing those echo signals exceeding the detection threshold (i.e. the signals representing echoes from within zone 35) potentiometer 71 providing the detection threshold bias. The resulting signal $\overline{ECHO}$ is applied to inverter 72 for providing the ECHO signal, which is then inputted to the relay controller 23. Logic gate 73 is effective to reset the integrator during the "blanking period" to assure that the ECHO signals at the output of network 18 do not include reflections during such period.

Figure 10:
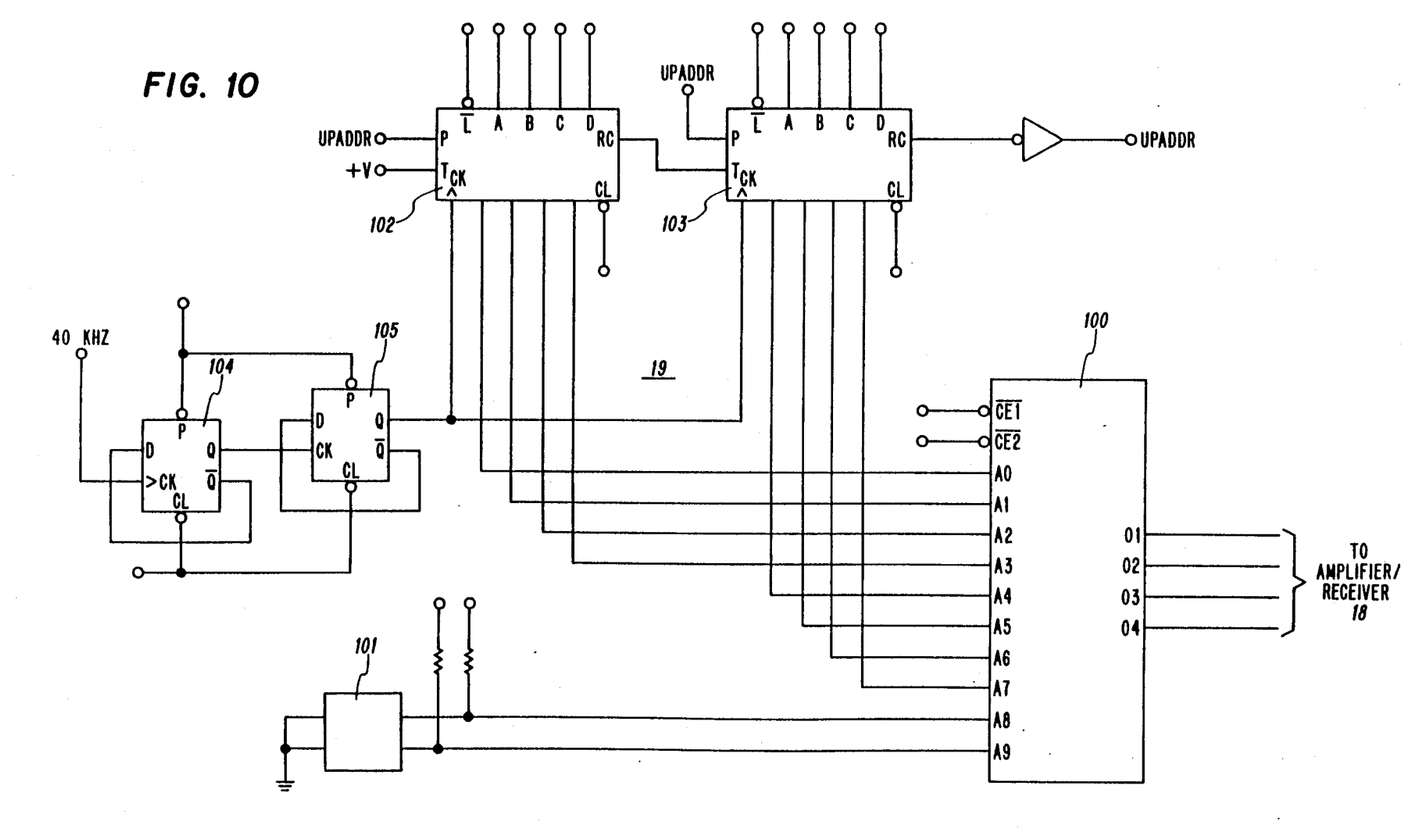
FIG. 10 is a simplified logic schematic diagram of a preferred embodiment of the gain controller portion depicted in FIG. 2.

A preferred form of the gain controller 19 is depicted in FIG. 10. Accordingly, experimentally determined gain data to produce the desired obstruction detection envelope previously described with respect to FIG. 11 is stored within programmable read only memory (PROM) 100, with multiple position switch 101 effective to allow the user to select alternate gain conditions (and therefore different "obstruction detection envelopes"). The interconnected counters 102 and 103 provide address generators, the outputs of which driving the PROM 100, with the interconnected flip-flops 104 and 105, along with counters 102 and 103, appropriately dividing the input clock signal, in this instance the 40 KHz signal. The output data information from PROM 100 is inputted to amplifier/receiver 18 for programmed digital gain control thereof.

Figure 7:
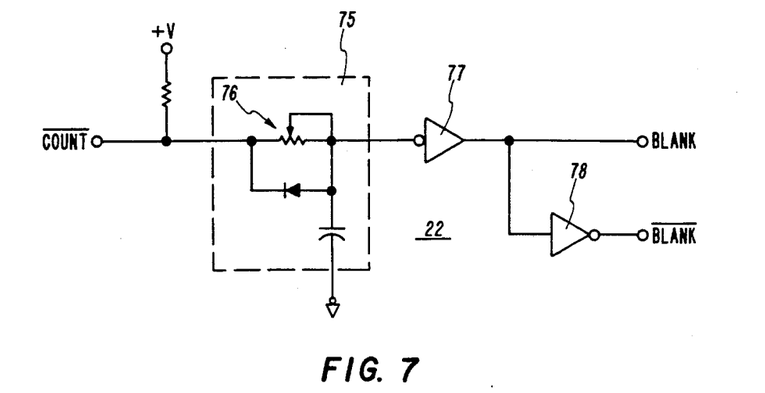
FIG. 7 is a simplified logic schematic diagram of a preferred embodiment of the blanking signal generator portion depicted in FIG. 2.

FIG. 7 depicts a preferred form of the blanking signal generator 22. Accordingly, the $\overline{COUNT}$ signal (from pulse generator 17) is inputted to a delay network 75, which RC time constant can be adjusted by potentiometer 76, generating the BLANK (and the $\overline{BLANK}$) signals at the output of inverters 77 and 78. Thus, the network 22 establishes the timing signals representing the commencement and termination of the blanking period, with delay network 75 determining the time span of such period.

Figure 8:
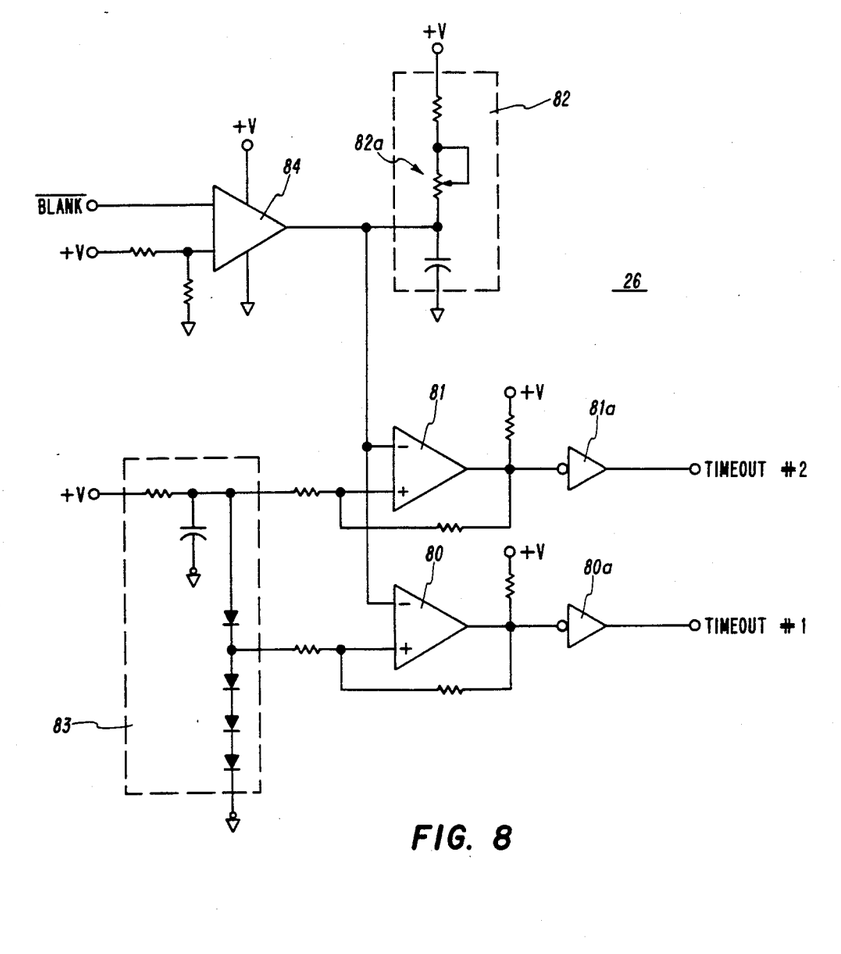
FIG. 8 is a simplified logic schematic diagram of a preferred embodiment of the timing signal generator portion depicted in FIG. 2.

A preferred form of the timing signal generator 26 is depicted in FIG. 8. Accordingly, timing signal 45 representing TIMEOUT #1 is generated by comparator 80 (and inverter 80a); and timing signal 46 representing TIMEOUT #2 is generated by comparator 81 (and inverter 81a). Network 82, particularly potentiometer 82a, controls the time that TIMEOUT #1 signal is generated, with network 83 setting the fixed time delay for generation of TIMEOUT #2 signal. Comparator 84 is effective to reset network 82 (and the timing signal generator) after each blanking period.

Figure 9:
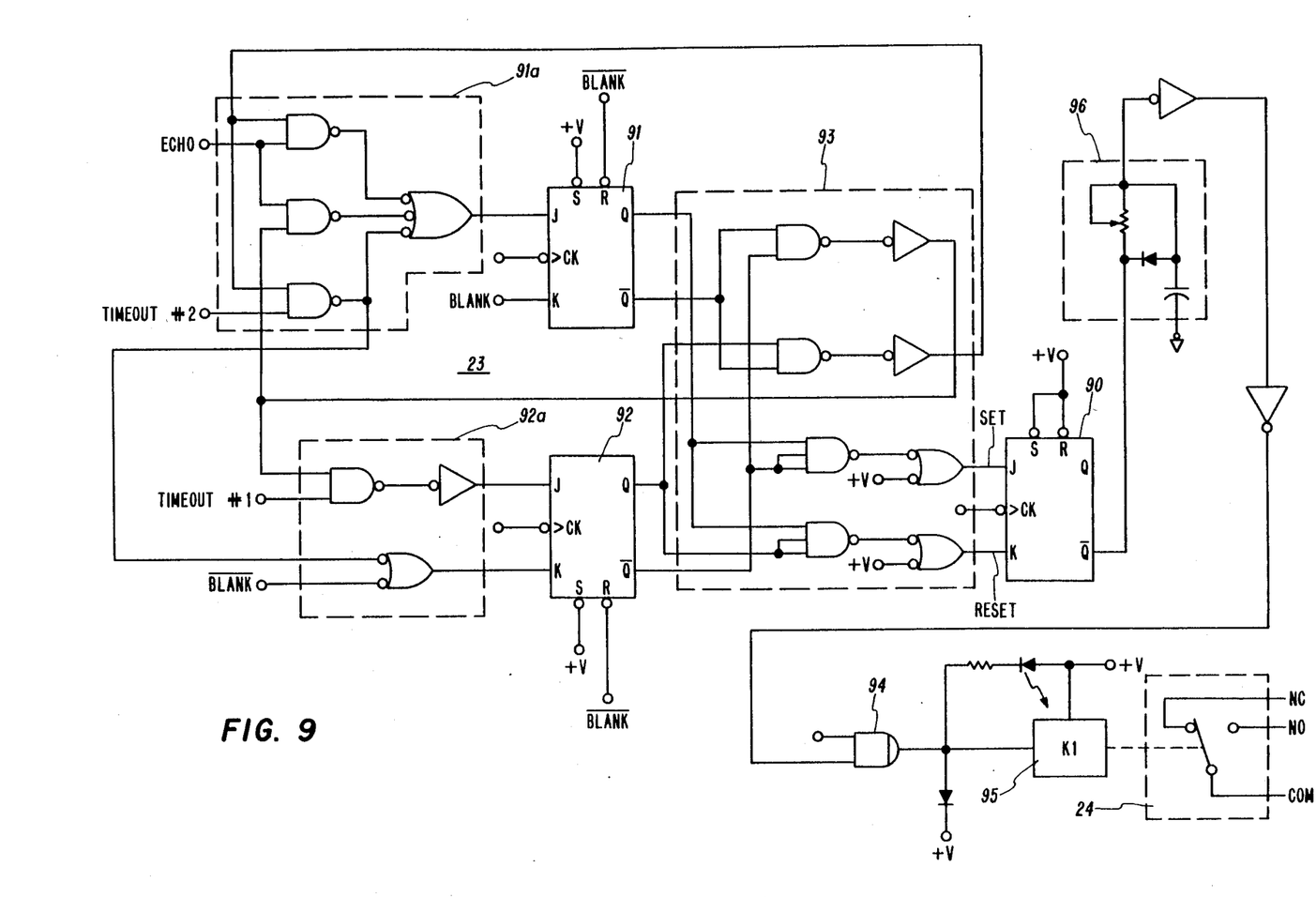
FIG. 9 is a simplified logic schematic diagram of a preferred embodiment of the relay controller and relay portions depicted in FIG. 2.

FIG. 9 depicts a preferred form of the relay controller 23 for actuating relay 24. Accordingly, the flip-flop 90 provides a "blockage" latch which is "set" (resulting in closure of relay 24) whenever the signal condition at the input to latch 90 indicates after each sonic burst (1) that an echo has been received before TIMEOUT #1 signal (indicating an obstruction within passageway), or (2) no echo was received before TIMEOUT #2 signal (indicating diverted echoes or system malfunction). Additionally, the latch 90 is "reset" whenever the signal condition at its input indicates the presence of an echo between TIMEOUT #1 and TIMEOUT #2 (indicating the echo from the opposite door jamb 13a and, therefore, a "clear" condition). The "set" and "reset" signals to latch 90 are provided by the combination of flip-flops 91 and 92, respective input gate networks 91a and 92a, and output logic gate network 93.

The output of latch 90 actuates the solenoid 95 associated with relay 24 by way of relay driver 94, a delay network 96 intermediate latch 90 and driver 94 preventing unnecessary relay chatter near the obstruction detection threshold. As depicted in FIG. 9, BLANK and $\overline{\text{BLANK}}$ signal inputs to the flip-flops 91 and 92 assure that the latch 90 is not set during the blanking period, thus preventing relay 24 from closing during this period.

Figure 11A:
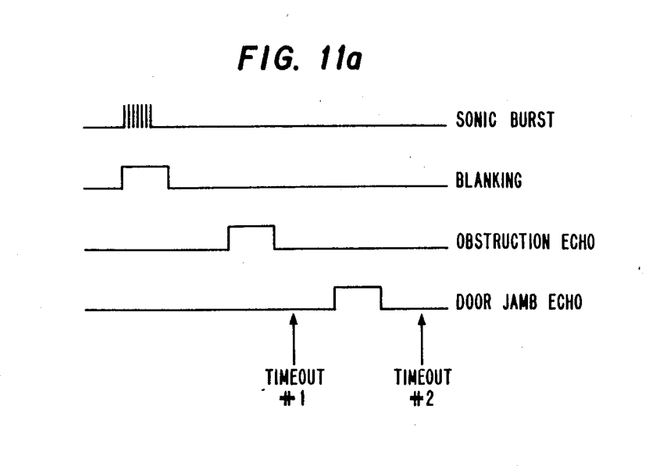
FIG. 11a is a timing diagram of the respective pertinent signals and pulses of the obstruction detector apparatus, illustrating their operational interrelationship.

As previously indicated, the closure of relay 24 is initiated when an echo is received after each sonic burst, subsequent to the blanking period, and prior to TIMEOUT #1, thus indicating the presence of an "obstruction". Such closure will also occur when no echo is received by TIMEOUT #2, indicating either echo diversion or some other system malfunction. On the other hand, when an echo is received after the sonic burst and blanking period, and between TIMEOUT #1 and TIMEOUT #2, this indicates reflection from the opposite door jamb, and therefore a no obstruction (or no malfunction), and therefore "clear",condition; and relay 24 is prevented from closing. A graphic depiction of these conditions is illustrated by the signal timing diagram of FIG. 11a.

The closure of relay 24 then deactivates the door operator to maintain the doors 12 in their open position; and the establishment of the "clear" condition enables the door operator to initiate door closing. To avoid the obstruction detector apparatus falsely indicating a closing door as being an obstruction, a disabling switch(not depicted) deactivates the entire obstruction detector unit at the initiation of door closing and reactivates the unit when the doors are fully open. It may also be desired to reactivate the unit when the doors begin to reopen, in which event the obstruction detector apparatus will assure that the doors return to full open (due to reflections from the door) before again reclosing.

The overall operation of the obstruction detector apparatus of the present invention is now described. Accordingly, the blanking signal generator 22 is initially adjusted to set the length of the blanking period, thereby determining the lateral passageway distance from door jamb 13 in which obstruction echoes are to be disregarded. The timing signal generator 26 is adjusted to set the time span of TIMEOUT #1, thereby establishing the proximity of the location 36 (FIG. 11) to the door jamb 13a, and thus the lateral distance of the passageway in which obstructions are to be detected. The gain controller 19 is then adjusted to determine the shape of the obstruction detection zone 35, and most significantly the width of such zone on each side of the passageway 11 in the direction of traversal through such passageway. In this regard, the width of such zone should be made large enough to timely detect the presence of obstructions approaching the passageway 11, but narrow enough to disregard pedestrians who are merely passing by the door passageway.

The automatic opening or closing of doors 12 is effected by a conventional door operator under the control of an appropriate sensor, such as a pressure sensor, photoelectric sensor, or motion detector, for opening doors 12 upon the approach of the pedestrian to the passageway 11 and reclosing the doors after the pedestrian has passed through such passageway, all as is conventionally known.

As previously described, the obstruction detector apparatus of the present invention is enabled whenever the doors 12 are being opened or, alternatively, reach their fully opened position. Thereafter, whenever a person or object enters the obstruction detection zone 35, the reflected echoes from such obstruction commands the door operator to maintain the doors in their open position until the obstruction has passed out of the obstruction zone 35. After clearance of this obstruction zone, the reflection from the door jamb 13a will signal the clear condition to the door operator, enabling the closing of the doors. The command to the door operator to maintain the doors in their open position also occurs when no reflections are received during (or after) the time that such reflection should have been received from door jamb 13a; and the doors 12 are thereafter not allowed to be closed until the obstruction detector apparatus again indicates a clear condition.

It is contemplated that various changes, additions, or modifications may be made to the disclosed preferred embodiment of the invention. For example, it may be desired to utilize a plurality of appropriately interconnected detector units. Also, it may be desirable to utilize a microprocessor to perform one or more of the functions being performed by the networks depicted in FIGS. 3–10. Various other modifications to the disclosed embodiment, as well as alternate embodiments, of the invention may become apparent to those skilled in the art without departing from the spirit and scope of the invention as solely defined by the appended claims.

What is claimed is:

1. A method for automatically controlling the operation of a closure member between an open position and a closed position for respectively opening and closing a passageway defined by first and second spaced boundary members, said method comprising:
   (a) transmitting acoustic energy from said first boundary member across said passageway toward second spaced boundary member;
   (b) receiving reflected echoes of said transmitted acoustic energy at said first boundary member; and
   (c) preventing said closure member from being moved from said open position toward said closed position when the transit time span of said reflected echoes is indicative of the presence of an obstruction within an obstruction detection zone, as well as in the absence of reflected echoes during a predetermined time period, and enabling said closure member to be moved from said open position toward said closed position when the transit time span of said reflected echoes is indicative of the absence of an obstruction within said obstruction detection zone.

2. In a system for automatically controlling the operation of a closure member between an open position and a closed position for respectively opening and closing a passageway defined by first and second spaced boundary members, obstruction detector apparatus comprising:
(a) acoustic energy transmitting means located at the first of said boundary members for transmitting acoustic energy across said passageway toward said second spaced boundary member;
(b) acoustic energy receiving means also disposed at said first boundary member for receiving reflected echoes of said transmitted acoustic energy; and
(c) electronic means responsive to the transit time span of said reflected echoes (1) for preventing said closure member from being moved from said open position toward said closed position when said transit time span is indicative of the presence of an obstruction within an obstruction detection zone and (2) for enabling said closure member to be moved from said open position toward said closed position when said transit time span is indicative of the absence of an obstruction within said obstruction detection zone, said electronic means also preventing said closure from being moved from said open position to said closed position in response to the absence of reflected echoes during a predetermined period.

3. The apparatus as set forth in claim 2, further including means for altering the response characteristics of said electronic means so as to effectively define the size of the obstruction detection zone.

4. The apparatus as set forth in claim 2, further comprising timing signal generator means for generating a first timing signal representative of the anticipated transit time span of a reflected echo from a specified location within said obstruction detection zone at or near said second spaced boundary member, and for generating a second timing signal representative of the anticipated transit time span of a reflected echo from a specified location beyond said second spaced boundary member; and comparator means for maintaining said closure in the open position when (1) a reflected echo to said receiving means is received during a time span less than the time span represented by said first timing signal or (2) a reflected echo is not received during a time span represented by said second timing signal, and for enabling said closure member to be moved toward said closed position when the transit time span of a reflected echo to said receiving means is between the time spans respectively represented by said first and second timing signals.

5. The apparatus as set forth in claim 4 further including means for disregarding reflected echoes received during an initial time period after the initiation of acoustic energy from said transmitting means.

6. Obstruction detector apparatus for operative interconnection with an automatic door operator of the type which controls the operation of a door between an open position and a closed position for respectively opening and closing a passageway defined by first and second spaced boundary members, said obstruction detector apparatus comprising:
(a) an ultrasonic energy transmitting transducer located at a first of said boundary members for transmitting ultrasonic energy across said passageway toward said second spaced boundary member;
(b) an ultrasonic energy receiver transducer also disposed at said first boundary member for receiving reflected echoes of said transmitted ultrasonic energy;
(c) timing signal generator means for generating (1) a first timing signal representative of the anticipated transit time span of a reflected echo from a location which is within an obstruction detection zone and immediately in front of said second boundary member and (2) a second timing signal representative of the anticipated transit time span of a reflected echo from a location in the energy transmission path and beyond said second boundary member;
(d) amplifier means having an input coupled to the output of said ultrasonic energy receiver transducer means to generate an amplified signal at its output corresponding to a reflected echo received by said ultrasonic energy receiver transducer; and
(e) controller means for comparing said first timing signal, said second timing signal, and said amplified signal, and for preventing said door operator from moving said door from said open position toward said closed position when (1) a reflected echo is received at said receiver transducer during a time span less than the time span represented by said first timing signal or (2) a reflected echo is not received during a time span represented by said second timing signal, and for enabling said door operator to move said door towards said closed position when the transit time span of a reflected echo at said receiver transducer is between the time spans respectively represented by said first and second timing signals.

7. The obstruction detector apparatus as set forth in claim 6 further comprising blanking signal generator means for generating a third timing signal representative of an initial blanking period following the initiation of transmission of ultrasonic energy from said transmitting transducer, said controller means being operative to disregard reflected echoes during said initial blanking period.

8. The obstruction detector apparatus as set forth in claim 6 wherein said amplifier means is gain-controlled to variably amplify reflected echo signals from said ultrasonic energy receiver transducer and to generate an amplified signal to said controller only representing a reflection from an object within said obstruction detection zone.

9. The obstruction detector apparatus as set forth in claim 8, further comprising gain controller means for providing programmed gain data to said amplifier means, said programmed gain data corresponding to the extent of amplification of reflected echoes from objects solely within said obstruction detection zone.

* * * * *

UNITED STATES PATENT AND TRADEMARK OFFICE
CERTIFICATE OF CORRECTION

PATENT NO. : 4,706,227

DATED : Nov. 10, 1987

INVENTOR(S) : Dale R. DuVall, John E. Bateson, Lew V. Hewitt, and David P. Hewitt It is certified that error appears in the above-identified patent and that said Letters Patent is hereby corrected as shown below:

Column 5, line 64, "COUNT" should be -- COUNT --.

Column 5, line 65, "COUNT" should be -- COUNT --.

Signed and Sealed this

Nineteenth Day of April, 1988

Attest:

DONALD J. QUIGG

Attesting Officer

Commissioner of Patents and Trademarks